(12) United States Patent
Ressler et al.

(10) Patent No.: US 12,504,172 B1
(45) Date of Patent: Dec. 23, 2025

(54) MULTI-CONFIGURATION FIRE PIT GRATE

(71) Applicant: Lamplight Farms Incorporated, Menomonee Falls, WI (US)

(72) Inventors: Kyle Ressler, West Bend, WI (US); Tandrea Sperfslage, Campbellsport, WI (US); Andrew Schauer, Waukesha, WI (US); Timothy Wick, Brookfield, WI (US); Andrew Alan Harmeling, Milwaukee, WI (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 350 days.

(21) Appl. No.: 18/205,164

(22) Filed: Jun. 2, 2023

Related U.S. Application Data (60) Provisional application No. 63/348,172, filed on Jun. 2, 2022.

(51) Int. Cl.
  *F23B 20/00* (2006.01)
  *F24B 5/02* (2006.01)
  *F24B 13/00* (2006.01)

(52) U.S. Cl.
  CPC ............ *F24B 5/021* (2013.01); *F24B 13/008* (2013.01)

(58) Field of Classification Search
  CPC ............................... F24B 5/021; F24B 13/008
  USPC ......................................................... 126/65
  See application file for complete search history.

(56) References Cited

U.S. PATENT DOCUMENTS

| | | | | |
|---|---|---|---|---|
| 2,722,883 | A * | 11/1955 | Rignell | A47J 37/0704 |
| | | | | 126/25 R |
| 11,774,089 | B1 * | 10/2023 | Weilert | F23B 1/26 |
| | | | | 126/540 |
| 2007/0137634 | A1 * | 6/2007 | Traeger | A47J 37/0704 |
| | | | | 126/29 |
| 2009/0165772 | A1 * | 7/2009 | Hunt | A47J 36/2477 |
| | | | | 126/26 |
| 2020/0096199 | A1 * | 3/2020 | Harrington | F24B 5/025 |

* cited by examiner

*Primary Examiner* — Avinash A Savani
(74) *Attorney, Agent, or Firm* — GableGotwals; David G. Woodral (57) ABSTRACT

A fire pit combustion chamber has an inner wall and a floor having perforations for allowing ash and to pass therethrough and having a floor opening selectively coverable by a lift out section having a rim and having a cover with a raised shape for directing fuel outwardly as the fuel burns. The inverted cover is also receivable within the opening. The cover may define cover openings. A floor recess receives the rim to prevent lateral movement of the cover. An ash pan is below the floor for receiving ash and is removeable though the floor opening. A chute below the floor directs ash into the ash pan. The ash pan may conform to the chute for permitting the ash pan to pass into the chute and may be suspended therefrom. A second ash pan e.g., a removable drawer, may collecting ash when the ash pan is removed.

19 Claims, 9 Drawing Sheets

MULTI-CONFIGURATION FIRE PIT GRATE

CROSS-REFERENCE TO RELATED CASES

This application claims the benefit of U.S. provisional patent application Ser. No. 63/348,172, filed on Jun. 2, 2022, and incorporates such provisional application by reference into this disclosure as if fully set out at this point.

FIELD OF THE INVENTION

This disclosure relates to outdoor combustion devices in general and, more specifically, to outdoor solid fuel fire pits.

BACKGROUND OF THE INVENTION

Outdoor fire pits may be equipped to burn solid fuel in the form of natural logs, synthetic logs, fuel packs, or other fuel types. Some fire pits are designed to deliver brighter flame and lower amounts of smoke by reliance on internal combustion chambers that control and direct the influx of combustion air relative to the burning fuel inside. However, all solid fuel types will still result in some amount of ash and possibly other solid by-products that do not burn.

Fire grates that are known in the art can allow ash and other solid products that are smaller than a certain size to fall away from the fuel source such that they will not immediately impede the fire or be likely to be drawn out of the fire pit with hot gaseous combustion products. However, the ash must be dealt with and removed at some point or performance of the fire pit will ultimately diminish.

What is needed is a system and method for dealing with the above and related issues.

SUMMARY OF THE INVENTION

The fire pit of the invention, in one aspect, provides dual functionality by allowing a lift out section to be oriented in a domed, or upwardly projecting configuration, and in an inverted, or downwardly projecting configuration. When in a domed configuration, the fire pit is most suited for use with pellets. When in an inverted configuration, the fire pit is most suited for use with cord wood. The domed configuration causes pellets to flow outward and promotes better burning. When in an inverted configuration, more room is available within the combustion chamber, thereby allowing for better fitment of pieces of cord wood, which is problematic with some fire pit geometries. Preferably, the lift-out section is provided with a handle on each side so that a handle is accessible in either orientation so that a user can use a poker to lift out the lift out section when in the domed or inverted configuration.

Permitting removal of the lift out section allows for easy clean-up of ash and char because oftentimes pieces of char remain that do not completely burn and, therefore, are unable to fall through grate holes and perforations into an ash pan. By permitting removal of the lift out section, the lift out section may be tapped against the inside wall, resulting in remaining bits of ash and char falling into a chute or funnel, thereby making clean up and disposal easier.

In greater detail, a fire pit of the invention has an inner wall and a floor defining a combustion chamber. The floor defines perforations for admitting air into the combustion chamber and for allowing ash and to pass through the perforations. The floor defines a floor opening.

A lift out section is provided for selectively covering the floor opening. The lift out section has a cover defining a rim, wherein the rim is received on the floor surrounding the floor opening. A handle may be affixed to the cover of the lift out section for allowing easy removal of the cover. In one embodiment, the cover has a raised shape, e.g., domed, conic, or tapered, wherein a center portion of the cover is above an outer portion of the cover for directing fuel toward the inner wall and to the floor as the fuel burns. The cover may define a plurality of cover openings proximate to the rim of the cover or proximate to a center portion of the cover. Preferably, the lift out section is configured to be received in the floor opening in an inverted orientation wherein a center portion of the cover is below the rim.

The floor surrounding the floor opening may define a recess for receiving the rim of the cover for preventing movement or displacement of the lift out section due to lateral forces from the presence of shifting fuel loads or for other reasons.

An ash pan is located below the floor for receiving ash from the combustion of fuel within the combustion chamber. The ash pan may be sized to be removeable though the floor opening when the lift out section is removed.

A chute may be provided below the floor for directing ash into the ash pan, wherein the chute has an upper end that may be affixed to the floor or to the inner wall of the combustion chamber. The ash pan may have a shape that conforms to the chute for permitting the ash pan to pass into or below the chute.

The ash pan may in include an ash pan floor circumscribed by an ascending wall wherein the ascending wall is sized to fit within a lower opening of the chute. The ascending wall may at least approximately matches an angle of the chute proximate the lower opening. The ash pan may be suspended from the chute below the lower opening.

A second ash pan may be provided below the chute, e.g., in the form of a removable drawer, for collecting ash when the ash pan is removed.

DETAILED DESCRIPTION OF THE PREFERRED EMBODIMENTS

Figure 1:
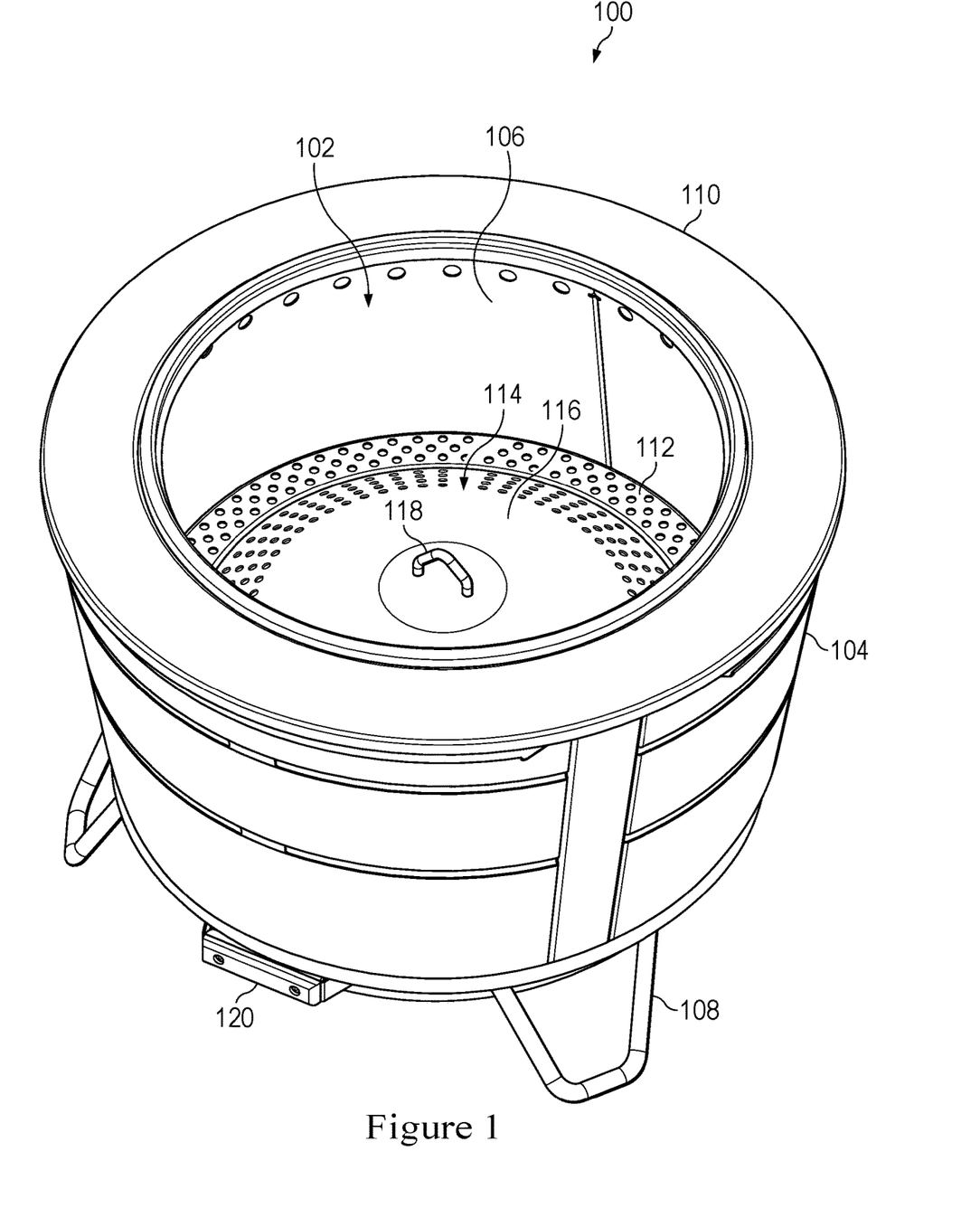
FIG. 1 is a perspective view of a fire pit with ash handling system according to aspects of the present disclosure.
Figure 2:
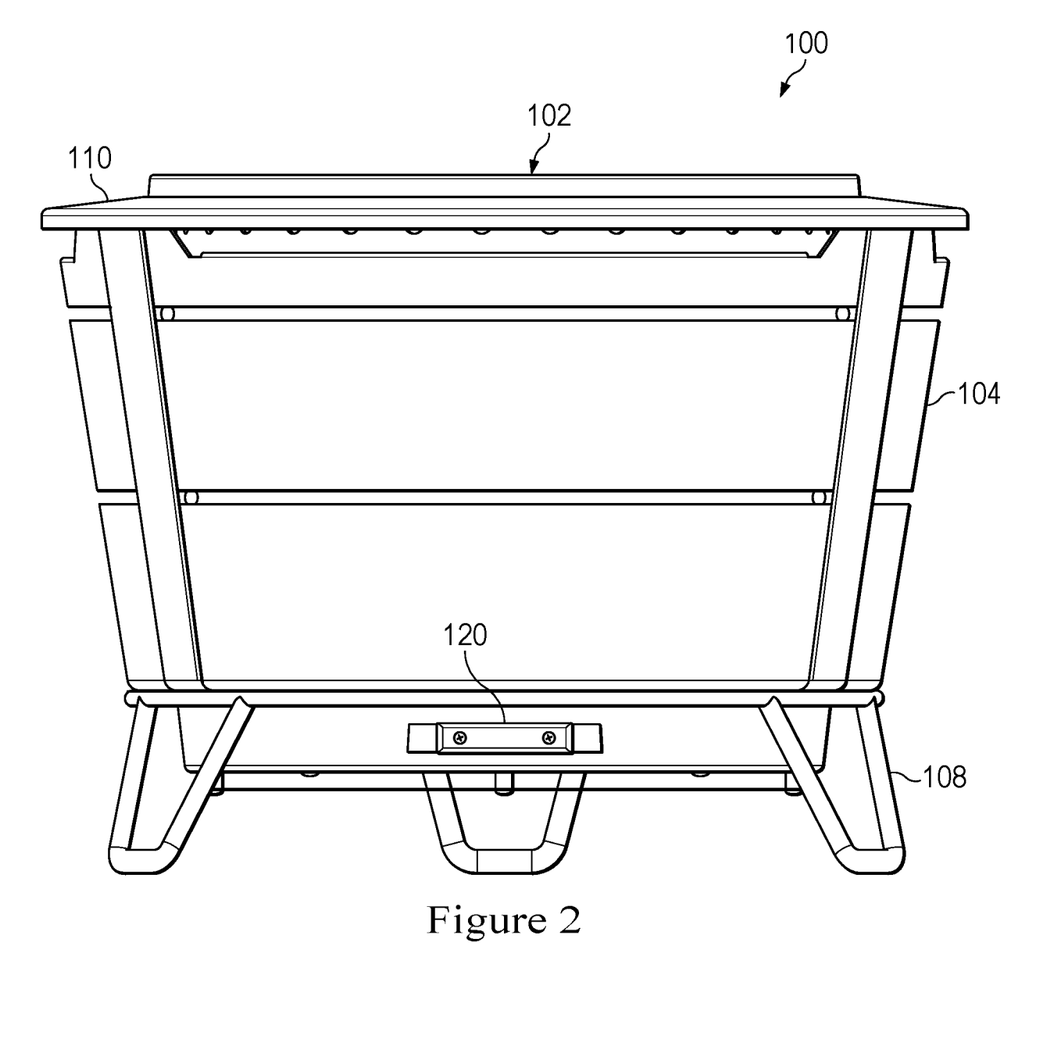
FIG. 2 is a side view of the fire pit of FIG. 1.

Referring now to FIG. 1, a perspective view of a fire pit 100 with ash handling system according to aspects of the present disclosure is shown. FIG. 2 is a side view of the fire pit 100 of FIG. 1. The fire pit 100 may comprise a solid fuel engine or combustion chamber 102 that burns solid fuel such as natural logs, synthetic or manufactured logs, wood pellets, bagged or prepackaged fuel, or other fuels. Ventilation or air supply may be provided at various locations in the combustion chamber 102 to maximize flame, minimize smoke, and/or accomplish a variety of other goals. In some cases, air enters the fire pit 100 via openings in outer wall 104. The wall 104 may be slatted or otherwise perforated for admitting air. An inner wall 106 may at least partially define the combustion chamber 102 and define various air intakes to the combustion chamber 102. A fire pit that operates similarly to the manner described is disclosed in US Patent Application Publication No. US 2020/0096199 A1 by Harrington, et al., which is hereby incorporated by reference.

As shown, the fire pit 100 has a top cover 110 spanning what would otherwise be an open space between walls 104, 106. The fire pit 100 may sit on a base 108 or may be provided with a stand for elevating the fire pit 100 to a more desirable height and/or reduce the chance of scorching grass or other material near the fire pit 100.

The fire pit 100 may have a bottom grate or perforated floor 112. The floor 112 may be considered a part of the combustion chamber 102 in that combustion air may enter the combustion chamber 102 via the floor 112, as well as the floor providing for ash and solid material to pass therethrough via the perforations or openings therein.

The floor 112 may be configured as a flat or planar ring or annular component, or may otherwise define a large opening therein that is selectively covered by a lift out section 114. The lift out section 114 may comprise a cover 116 and may have a handle 118 on or near a center of top thereof allowing for easy removal (e.g., by hand or with a hook or other fire tending tool). The cover 116 may have a domed, conic, or tapered shape such that fuel is directed toward the inner wall 106 and the floor 112 as the fire burns, i.e., the cover 116 has a raised shape wherein a center portion if above an outer portion. This may promote ash flow through the floor 112 as well as promote desired burning characteristics by tending to move active combustion toward openings in the floor 112 and/or wall 106. The cover 116 may also define openings or perforations located more toward the outer edge (e.g., toward the floor 112) than the more centrally located handle 118.

As a part of the ash handling system and mechanism, the fire pit 100 may include a removable ash pan 120. The ash pan 120 may comprise a removable drawer with a handle for ease of operation. The ash pan 120 may collect ash and solid matter that passes through the floor 112 and/or cover 116. The ash pan 120 may be periodically removed by the user to dispose of ash. The ash pan 120 may be one or multiple options for ash handling where the ash pan 120 is easily located (e.g., when the fire pit 100 is used with the stand 108).

Figure 3:
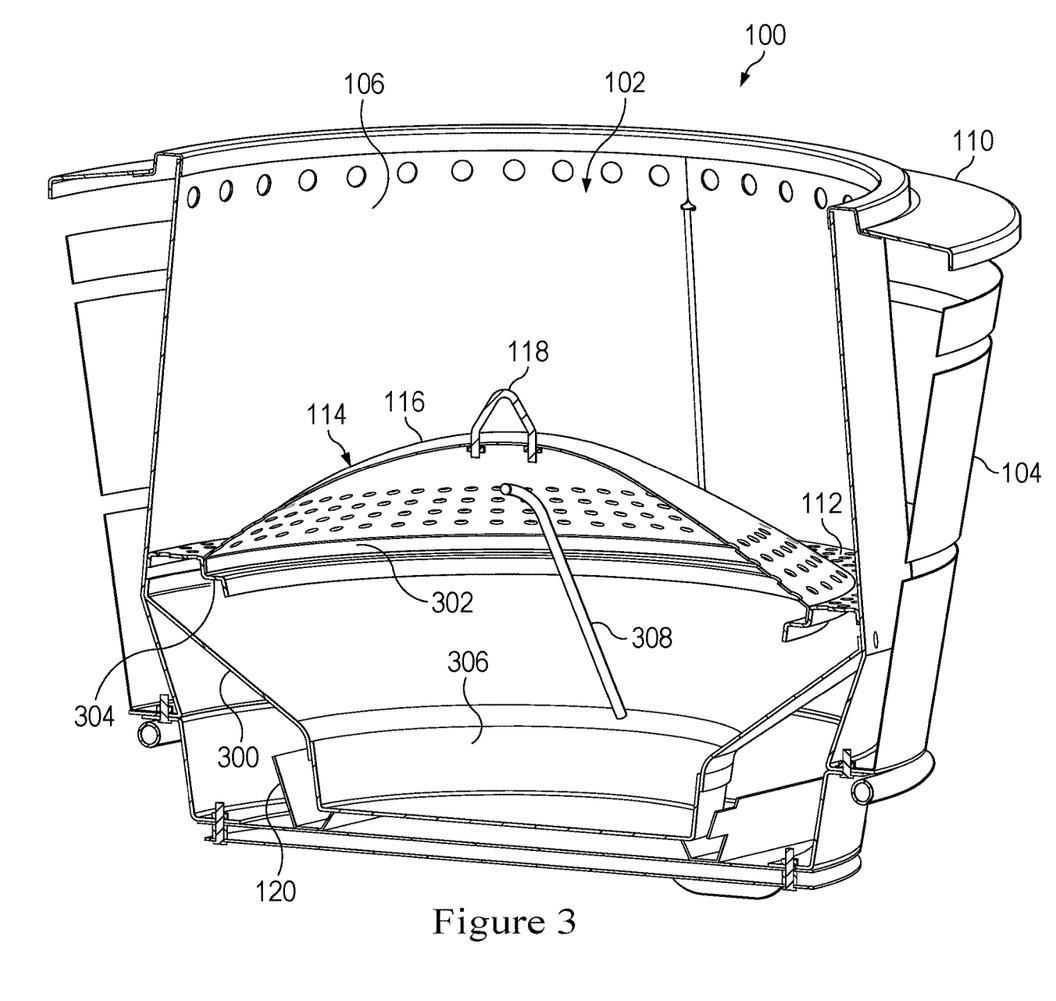
FIG. 3 is a perspective cutaway view of the fire pit of FIG. 1.

Referring now to FIG. 3, a perspective cutaway view of the fire pit of FIG. 1 is shown. Here it can be seen that additional features and components provide for additional ash handling systems and methods. Instead of, or in addition to the ash pan 120, the fire pit 100 may contain a 306. The lift out ash pan 306 may be situated below the cover 116, situated to collect ashes and solid material falling through openings in the cover 116 and/or the floor 112. The lift out ash pan 306 may include an affixed handle 308 that may be used to lift the ash pan 306 out of the fire pit 100 through the combustion chamber 102 without the need to access the exterior of the fire pit 100 (e.g., around or below the outer wall 104). In some embodiments, in order to access the handle 308 and/or ash pan 306 the lift out section 114 or cover 116 may first be removed (e.g., by the handle 118). The handle 308 may extend upwardly from the ash pan 306 toward the cover 116 and in some cases may occupy part of a space near or within the cover 116. The handle 308 may have an arc shape, a loop shape, a series of joined straight segments, and/or another configuration.

The cutaway perspective of FIG. 3 also illustrates that the floor 112 may have a recess 304 circumscribing a central opening therein that is sized at least large enough to allow the lift out ash pan 306 and handle 308 to pass through. The central opening defined by the floor 112 and/or recess 304 may be circular or have another shape. The lift out section 114 may have a rim 302 having a cooperating size and shape with the recess 304 to fit therein. Fitting of the rim 302 in the recess 304 may ensure the lift out section is properly placed with respect to the floor 112 and/or prevent unwanted movement of the lift out section 114 when the fire pit 100 is in use. The rim 302 may be integral with, and/or may descend, from the cover 116.

The ash pan 120 and/or the lift out ash pan 306 may have a foot print or area for collecting falling ash and other solid material that is smaller than an overhead area of the floor 112 including the lift out section 114. Therefore, a chute 300 may be provided for directing ash and other solid material falling through the floor 112 and/or lift out section 114 into the ash pan 306 or the ash pan 120. The chute 300 may comprise a funnel that may be frustoconical or at least have a frustoconical section as shown. In some embodiments, the chute 300 has a circular cross horizontal section of decreasing area from top to bottom. However, in other embodiments, the chute 300 may comprise one or planar sections joined together and having a lower opening sized to direct ash and/or solid matter into the ash pan 120 or the lift out ash pan 306. The chute 300 may be affixed at an upper portion to the floor 112 or to the inner wall 106. In some embodiments, attachment of the chute 300 to the inner wall 106 allow the inner wall 106 to provide intake openings below the floor 112, if desired.

Figure 4:
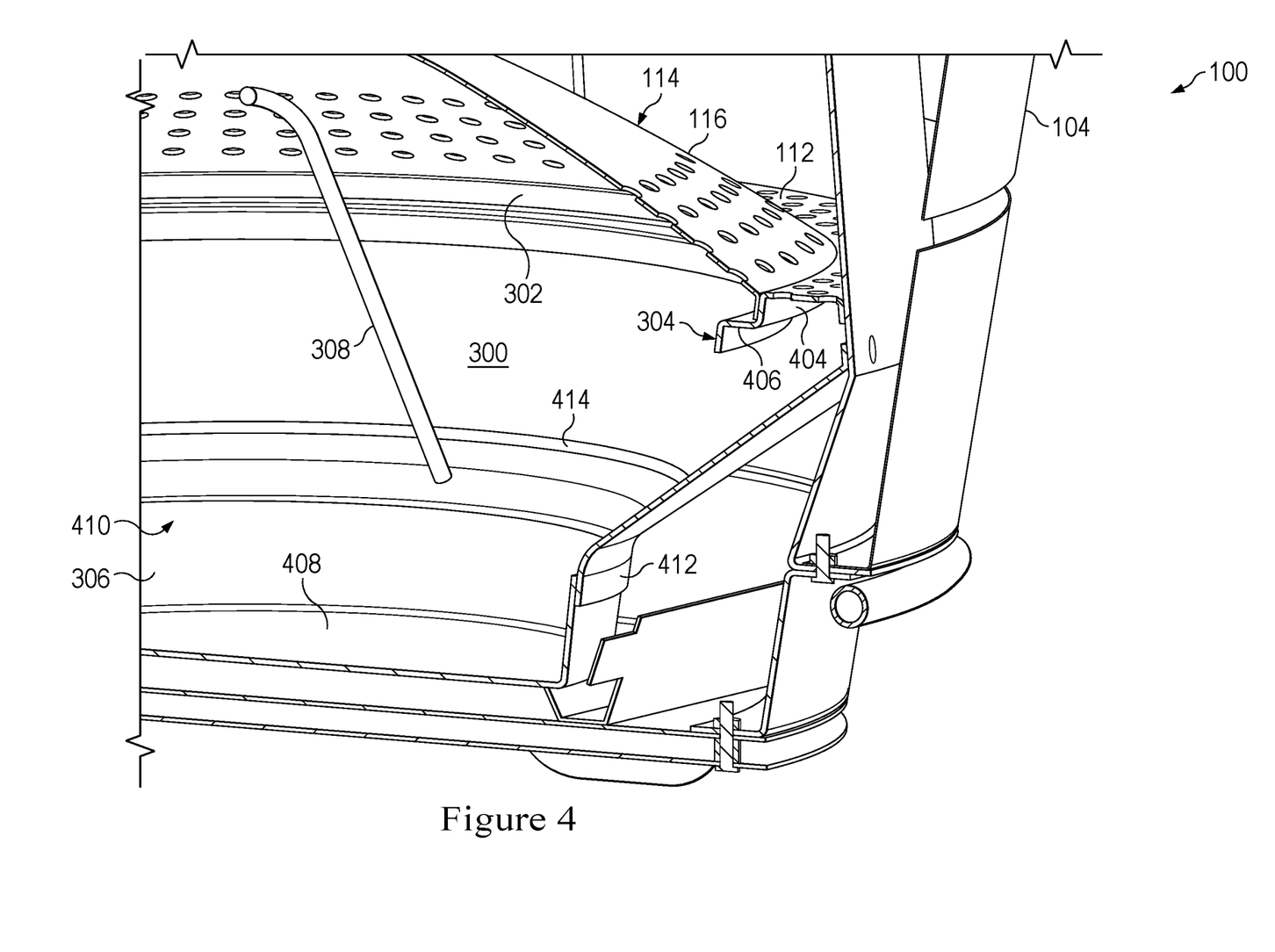
FIG. 4 is a close-up perspective cutaway view of the fire pit of FIG. 1.

FIG. 4 is a close-up perspective cutaway view of the fire pit of FIG. 1. FIG. 4 further illustrates the relationship between various components internal to the fire pit 100. The recess 304 of the floor 112 may comprise a horizontal descending wall 404 fitting to a horizontal shelf 406. The wall 404 may or may not be vertical but may be wide enough to accommodate the rim 302 of the lift out section 114 such that the rim 302 may sit on the shelf 406. The shelf 406 may not be perfectly horizontal but the opening defined by the shelf 406 may be small enough that the lift out section 114 cannot inadvertently fall completely into the opening and below the floor 112. The handle 308 of the ash pan 306, when present, may also prevent this. In some embodiments, contact between the rim 302 and/or the cover 116 against the wall 404 may prevent movement or displacement of the lift out section 114 even in the presence of shifting fuel loads or other lateral forces.

The ash pan 306 may comprise a floor 408 circumscribed by an ascending wall 412. In some embodiments, the floor 408 is circular and planar. The wall 412 may be vertical or have another ascending angle or profile. The floor 408 and wall 412 may be sized to fit within a lower opening 410 of the chute 300. An outward protruding flange 414 may be affixed or integrated with the wall and have an outer diameter larger than a diameter of the lower opening 410 of the chute 300. An angle of the flange 414 may match or approximately match the angle or profile of the chute 300 proximate the lower opening 410 such that the ash pan 306 is suspended from the chute 300 below the lower opening 410 to capture ash and solid matter. The handle 308 may affix to an inner side of the wall 412 and/or to the flange 414.

Figure 5:
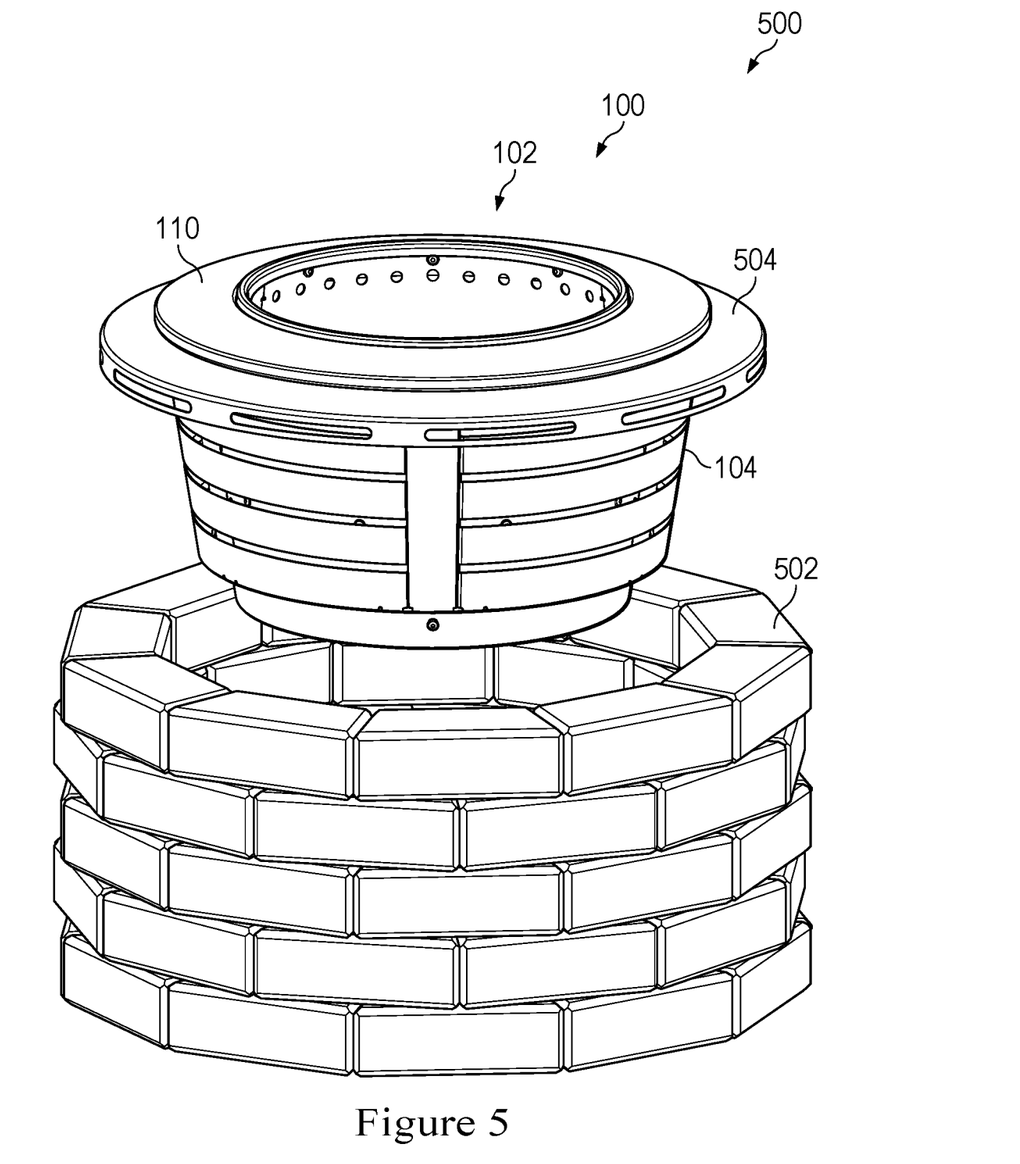
FIG. 5 is a partially exploded perspective view of a fire pit installation with ash handling system according to aspects of the present disclosure.

Referring now to FIG. 5, a partially exploded perspective view of a fire pit installation 500 with ash handling system according to aspects of the present disclosure is shown. The fire pit installation 500 may comprise a permanent structure 502 into which the fire pit 100 is installed. Various ventilation mechanisms may be needed for the installation 500 to allow proper air flow to the fire pit 100, especially if the fire pit 100 relies on air intake separate from the top of the combustion chamber 102. Thus, a ventilation ring 504 may be used and/or ventilation openings in the structure 502 itself.

If no access is provided through the permanent structure 502 to access an ash pan, such as ash pan 120, it would not suitable or practical for use. As shown, for example, once the fire pit 100 is installed into the permanent structure 502, only the top cover 110 and/or the combustion chamber 102 are easily accessible. Thus, the lift out ash pan 306 as described above may be utilized. The ash pan 120, if provided, may be discarded or left in place (if large enough to accommodate the lift out ash pan 306).

Figure 6:
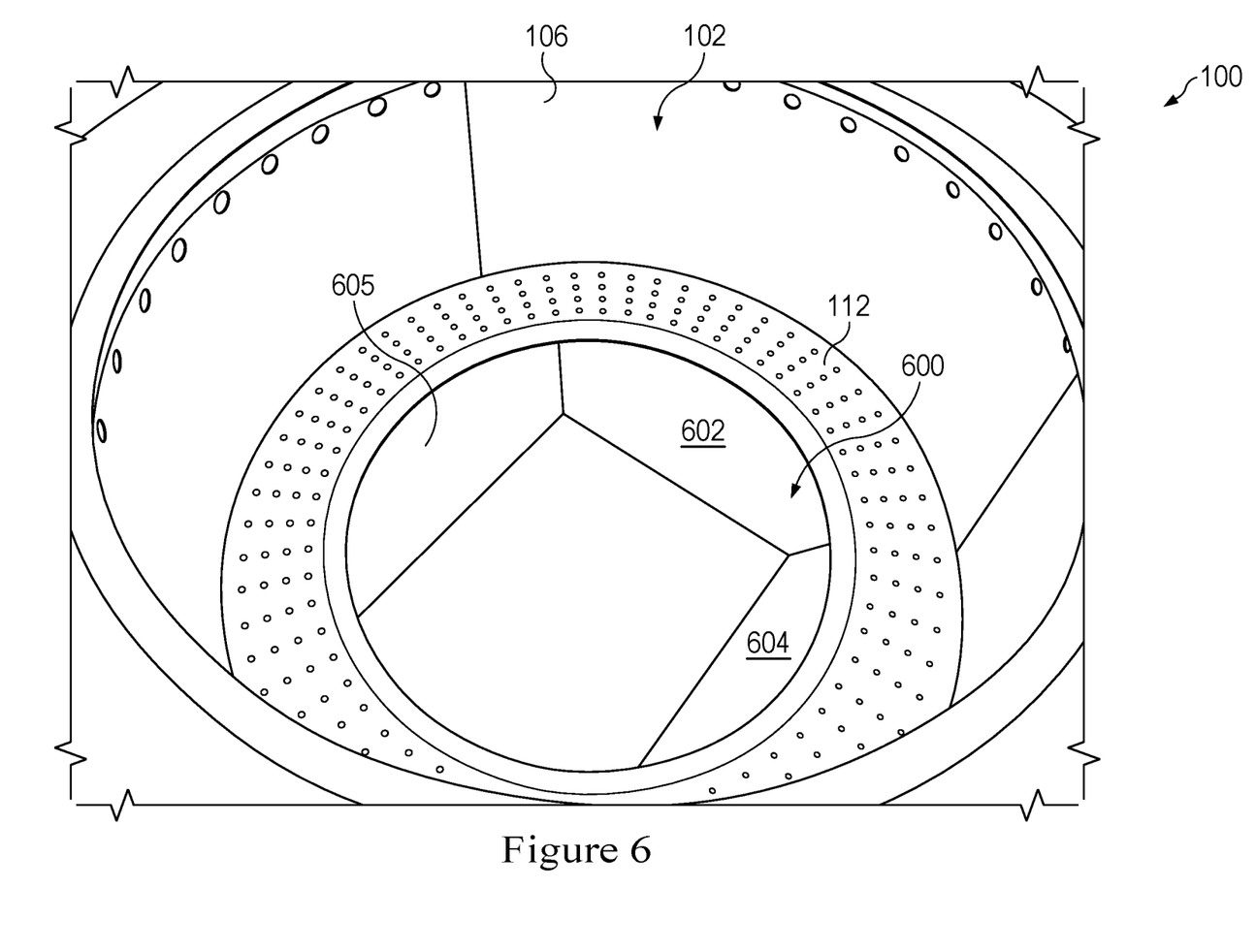
FIG. 6 is close-up interior perspective view of another fire pit with ash handling system according to aspects of the present disclosure.

FIG. 6 is close-up interior perspective view of another fire pit 100 with ash handling system according to aspects of the present disclosure. FIG. 6 illustrates the interior of the combustion chamber 102. Inner wall 106 can be seen circumscribing the floor 112. Lift out section 114 (FIGS. 3-4) has been removed along with the ash pan to illustrate interior chute 600. The chute 600 is provided in place of the chute 300 previously described. The chute 600 comprises planar panels 602, 604, 605, and another (out of frame) that join together and function to direct ash and debris into the ash pan 700 (FIG. 7).

Figure 7:
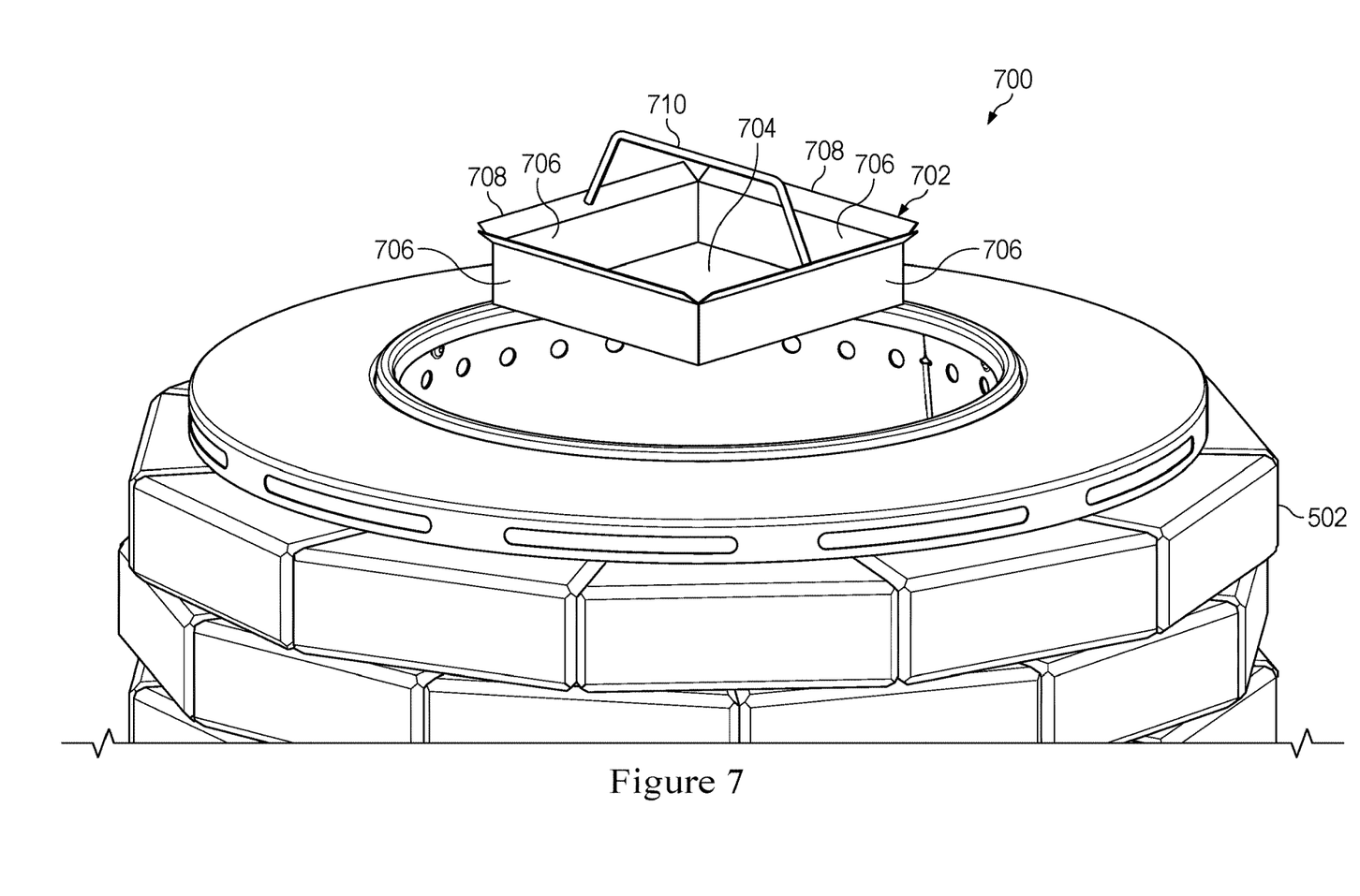
FIG. 7 is perspective view of the fire pit of FIG. 6 with ash pan removed.

FIG. 7 is perspective view of the fire pit of FIG. 6 with ash pan 700 removed. The ash pan 700 may have a shape that conforms to the funnel 600. The ash pan 700 has a squared or generally rectilinear body 702 that includes a floor 704 (which may be a square planar section) bounded by four upright walls 706. The walls 706 may be vertical or slightly tilted outward (e.g., leaning away from the floor 704). The top of each wall 706 may provide an outward projecting flange 708. The angle of the flanges 708 may comport with the angle of the panels 602, 604, 605 of the funnel 600, and the floor 704 and walls 706 may be sized to pass into or below the funnel in order for the ash pan 700 to be suspended below the funnel 600 by the flanges 708 (similar to the arrangement of FIG. 3, for example). A handle 710 may be affixed to a pair of opposing walls 706, opposing flanges 708, or elsewhere on the body 702 to allow for the ash pan 700 to be removed or inserted into the funnel 600 below the floor 112.

Figure 8:
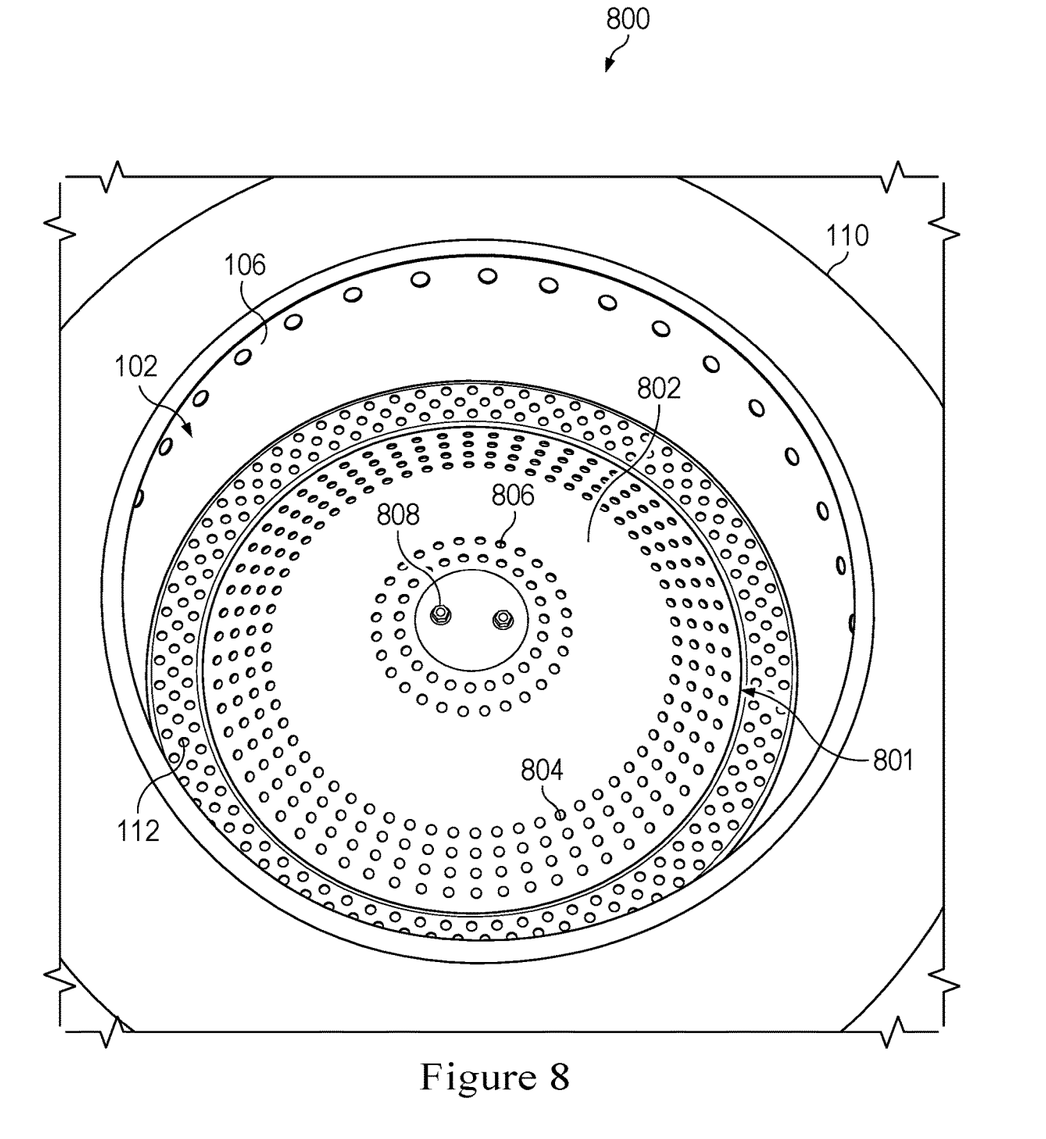
FIG. 8 is a top perspective view of another fire pit with ash handling system according to aspects of the present disclosure.
Figure 9:
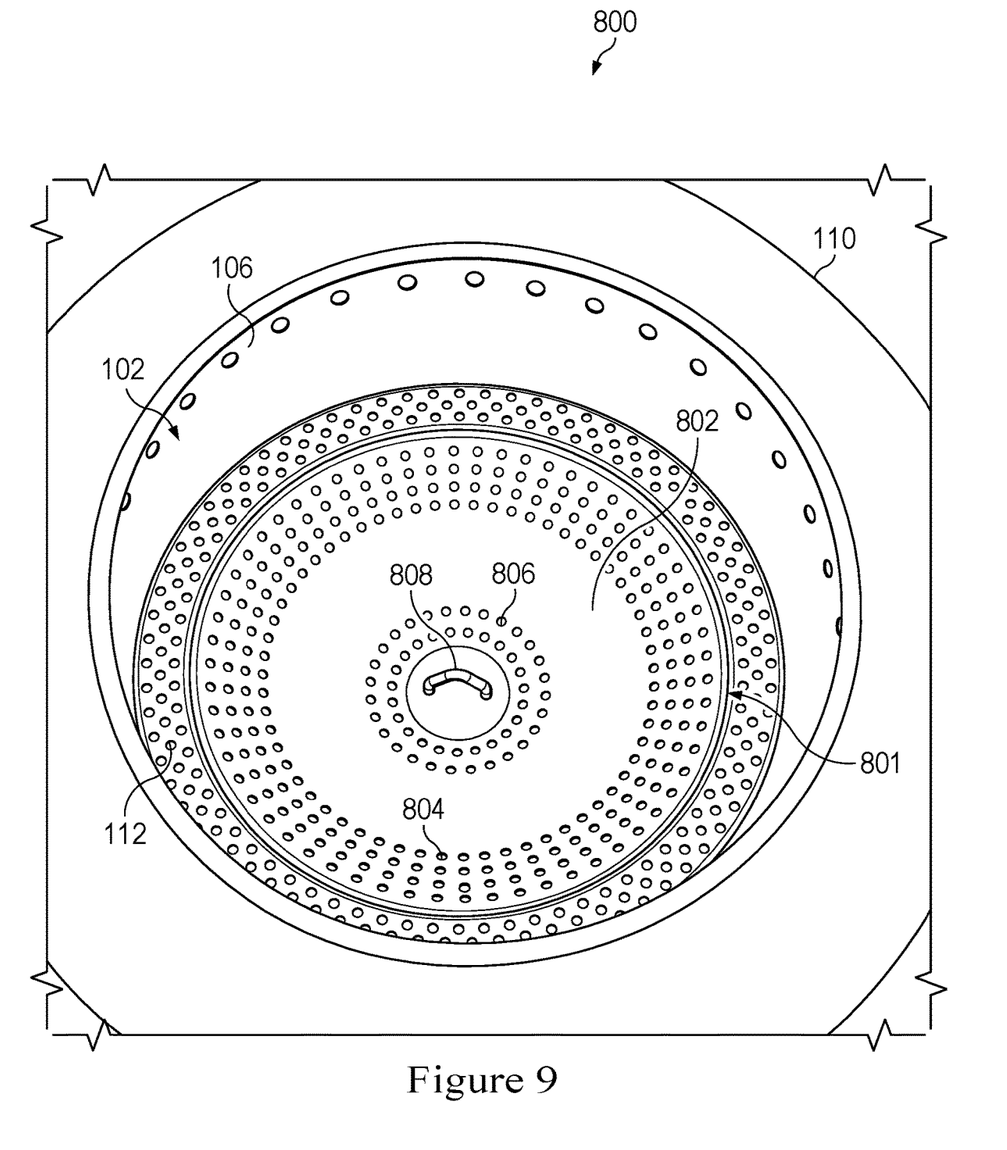
FIG. 9 is a top perspective view of the fire pit of FIG. 8 with a dome of the ash handling system in an inverted position.

Referring now to FIG. 8, a top perspective view of another fire pit 800 with a multi-configuration grate and ash handling system according to aspects of the present disclosure is shown. The fire pit 800 may be substantially similar or identical to fire pit 100 described above except as shown or described herein. FIG. 9 is a perspective view of the fire pit 800 with a lift out section 801 of the ash handling system in an inverted position.

The fire pit 800 provides all of the features and benefits of the fire pit 100 described above. However, the fire pit 800 provides a lift out section 801 comprising a cover 802 that can be inverted. The cover 802 may have a domed, conic, or tapered shape such that fuel is directed toward the inner wall 106 and the floor 112 as the fire burns when the cover 802 is fitted onto the floor 112 in an upright position. However, the cover 802 can be installed in the inverted position (e.g. with the point down) to create a larger available volume for fuel in the combustion chamber 102.

As described above, an upright (e.g., pointed side up) cover 802 may serve to promote combustion of pelletized fuel. However, pelletized fuel can easily flow down around the cover 802 whereas logs (natural or engineered) will tend to stack up on the cover 802, which reduces the amount of fuel that can be placed into the combustion chamber. By allowing the cover 802 to be installed into the floor 112 inverted, the full volume of the combustion chamber (e.g., from the floor 112 to the top of the combustion chamber 102), and even more, is available for solid fuel.

The cover 802 may define air flow and/or ash handling apertures 804 around an outer perimeter thereof. Additional apertures 806 may be defined centrally on the cover 802. In other embodiments, the entire cover 802 defines apertures. In further embodiments, there may be fewer apertures 804/806 than shown.

Particularly when inverted, portions of the cover 802 may not shed ashes, or allow them to fall completely through such that there are no ashes, or substantially no ashes, remaining on the cover 802 after a fire. Following use of the fire pit 800, the inverted cover 802 may be tipped on one side, or placed pointed side up, to dispose of ashes into the ash pan below (e.g., 306, FIG. 3 or 700, FIG. 7).

For ease of handling (by hand, or using tongs, pokers, or other fire tools) the cover 802 may include a handle 808. The handle 808 may be attached centrally on the cover 802. As shown, the handle 808 is attached such that a loop is provided when the cover 802 is in the inverted position (as in FIG. 9). However, the handle 808 could be installed to be available when the cover 802 is pointed side up (FIG. 8), or a pair of handles can be installed such that each side of the cover 802 has a handle. Handles may also be provided in additional locations.

While placement of handles and other handling features may differ from shown, with the handle 808 installed as illustrated, minimal disturbance of the flow and movement of pellet fuel results from the handle when the cover 802 is installed pointed side up, but the handle 808 is easily reached to dump ashes from the cover 802 when it has been used in an inverted configuration to burn logs or other large fuel pieces.

As shown in FIG. 3, the floor 112 may provide a recess 304. This recess 304 may receive and center the cover 802 in or on the floor 112. The cover 802 does not necessarily have a rim 302 in the embodiment of FIGS. 8-9. However, the outer edge of the cover 802 may nevertheless be sized and oriented such that the cover 802 is retained and centered whether the cover 802 is upright or inverted.

As can also be seen in FIG. 3, the handle 308 may be sized such that it fits into the upright domed cover 116. In embodiments where an invertible cover 802 is used, the handle 308, if present, may be foldable or movable, or may be reduced in height to allow the cover 802 to be used in the inverted configuration. In some embodiments, the cover 802 is used with fire pits having an externally removable ash pan such as ash pan 120 (FIG. 1), and a handle 308 may not be present.

It should be understood that various aspects of the ash handling systems and methods of the present disclosure may be adapted for use with fire pits other than those specifically constructed as shown herein. While benefits may vary, systems and methods of the present disclosure may be adapted for use with traditional fire pits (e.g., those without specific air flow provisions for reduction of smoke), fire pits having different geometrical shapes than those depicted herein, fire pits having different types of permanent installations than shown herein, fire pits having different portability features than those shown herein, and others.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A fire pit comprising:
an inner wall and a floor defining a combustion chamber;
wherein said floor defines perforations for admitting air into said combustion chamber and for allowing ash to pass through said perforations, said floor further defining a floor opening;
a lift out section for selectively covering said floor opening;
an ash pan below said floor for receiving ash
wherein said lift out section having a cover defining a rim, wherein said rim is received on said floor surrounding said floor opening; and
wherein said cover of said lift out section defines a plurality of cover openings proximate to said rim of said cover.

2. The fire pit according to claim 1 wherein:
said ash pan is removeable though said floor opening when said lift out section is removed.

3. The fire pit according to claim 1 further comprising:
a chute below said floor for directing ash into said ash pan.

4. The fire pit according to claim 3 wherein:
said ash pan has a shape that conforms to said chute for permitting said ash pan to pass into or below said chute.

5. The fire pit according to claim 3 wherein:
said chute has an upper end, said upper end is affixed to said floor or to said inner wall.

6. The fire pit according to claim 1 wherein:
said floor defines a recess surrounding said floor opening, said recess for receiving said rim of said cover for preventing movement or displacement of said lift out section due to lateral forces.

7. The fire pit according to claim 1 further comprising:
a handle affixed to said cover of said lift out section for allowing easy removal of said cover.

8. The fire pit according to claim 1 wherein:
said cover has a raised shape wherein a center portion of said cover is above an outer portion of said cover for directing fuel toward said inner wall and to said floor as the fuel burns.

9. The fire pit according to claim 8 wherein:
said cover has a shape selected from domed, conic or tapered.

10. The fire pit according to claim 1 wherein:
said cover of said lift out section defines a plurality of cover openings proximate to a center portion of said cover.

11. The fire pit according to claim 1 wherein:
said lift out section is configured to be received in said floor opening in an inverted orientation wherein a center portion of said cover is below said rim.

12. The fire pit according to claim 3 wherein:
said ash pan is comprised of a floor circumscribed by an ascending wall;
wherein said chute defines a lower opening; and
wherein said ascending wall is sized to fit within said lower opening of said chute.

13. The fire pit according to claim 12 wherein:
said ascending wall at least approximately matches an angle of said chute proximate said lower opening;
wherein said ash pan is suspended from said chute below said lower opening.

14. The fire pit according to claim 3 further comprising:
a second ash pan below said chute for collecting ash when said ash pan is removed.

15. The fire pit according to claim 14 wherein:
said second ash pan is comprised of a removable drawer.

16. A fire pit comprising:
an inner wall and a floor defining a combustion chamber;
wherein said floor defines perforations for admitting air into said combustion chamber and for allowing ash to pass through said perforations, said floor further defining a floor opening;
a lift out section for selectively covering said floor opening;
an ash pan below said floor for receiving ash;
wherein said lift out section having a cover defining a rim, wherein said rim is received on said floor surrounding said floor opening; and
wherein said cover of said lift out section defines a plurality of cover openings proximate to a center portion of said cover.

17. A fire pit comprising:
an inner wall and a floor defining a combustion chamber;
wherein said floor defines perforations for admitting air into said combustion chamber and for allowing ash to pass through said perforations, said floor further defining a floor opening;
a lift out section for selectively covering said floor opening;
an ash pan below said floor for receiving ash;
wherein said lift out section having a cover defining a rim, wherein said rim is received on said floor surrounding said floor opening; and
said lift out section is configured to be received in said floor opening in an inverted orientation wherein a center portion of said cover is below said rim.

18. A fire pit comprising:
an inner wall and a floor defining a combustion chamber;
wherein said floor defines perforations for admitting air into said combustion chamber and for allowing ash to pass through said perforations, said floor further defining a floor opening;
a lift out section for selectively covering said floor opening;
an ash pan below said floor for receiving ash;
a chute below said floor for directing ash into said ash pan;
said ash pan is comprised of a floor circumscribed by an ascending wall;
wherein said chute defines a lower opening; and
wherein said ascending wall is sized to fit within said lower opening of said chute.

19. A fire pit comprising:
an inner wall and a floor defining a combustion chamber;
wherein said floor defines perforations for admitting air into said combustion chamber and for allowing ash to pass through said perforations, said floor further defining a floor opening;
a lift out section for selectively covering said floor opening;
an ash pan below said floor for receiving ash;
a chute below said floor for directing ash into said ash pan;
said ash pan is comprised of a floor circumscribed by an ascending wall;
wherein said chute defines a lower opening; and
a second ash pan below said chute for collecting ash when said ash pan is removed.

\* \* \* \* \*